May 5, 1959

R. D. ATCHLEY 2,884,907

SERVO-MECHANISM

Filed Aug. 30, 1957

INVENTOR.
RAYMOND D. ATCHLEY
BY Philip Subrow
Max Gilden
ATTORNEYS

May 5, 1959  R. D. ATCHLEY  2,884,907
SERVO-MECHANISM
Filed Aug. 30, 1957  4 Sheets-Sheet 2
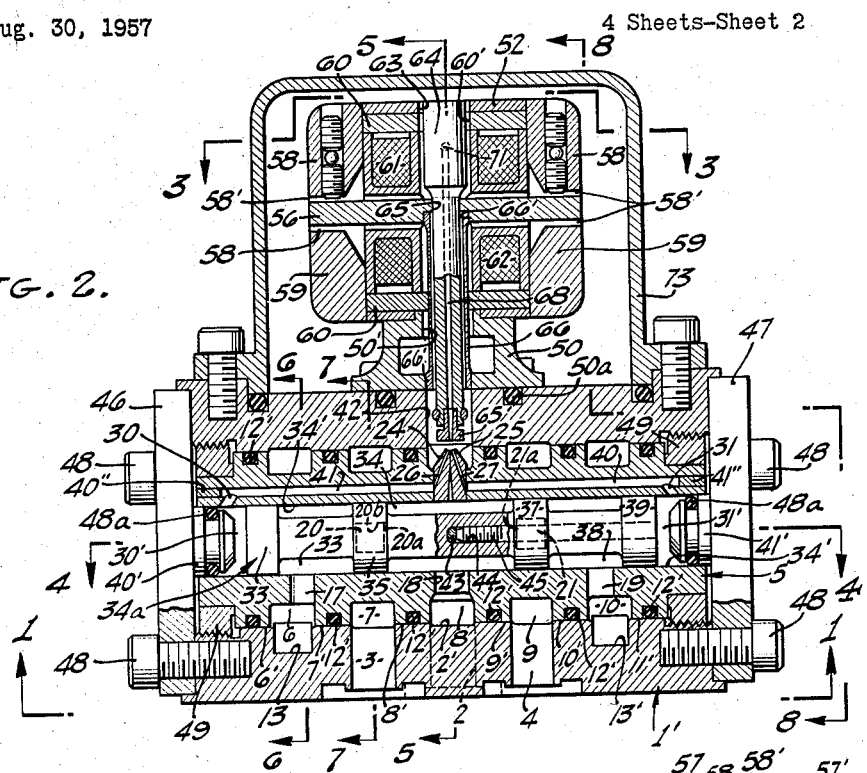
FIG. 2.
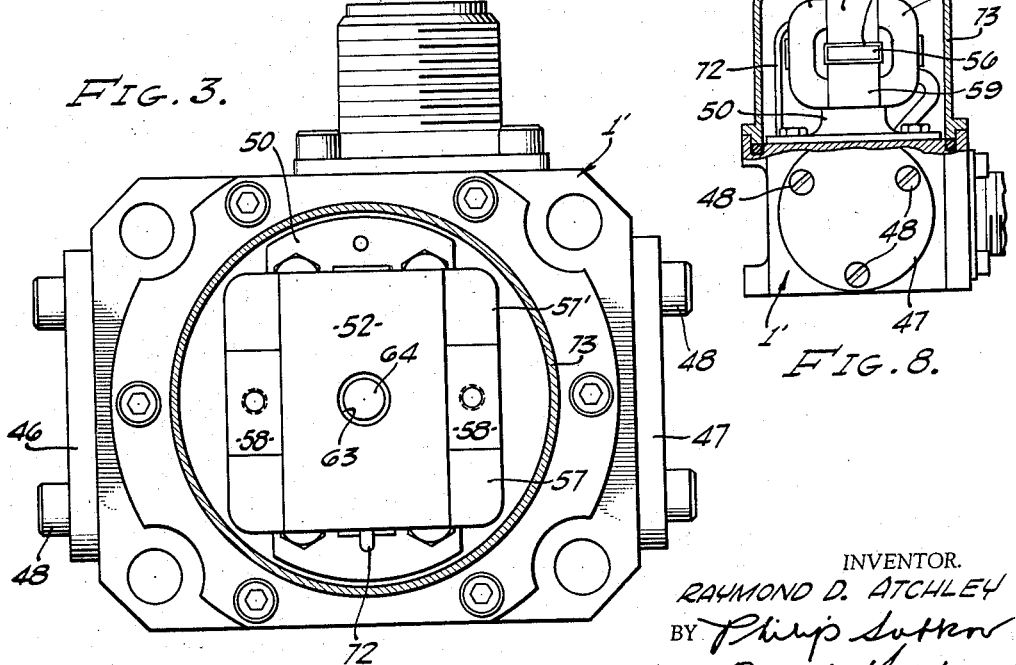
FIG. 3.
FIG. 8.
INVENTOR.
RAYMOND D. ATCHLEY
BY
ATTORNEYS

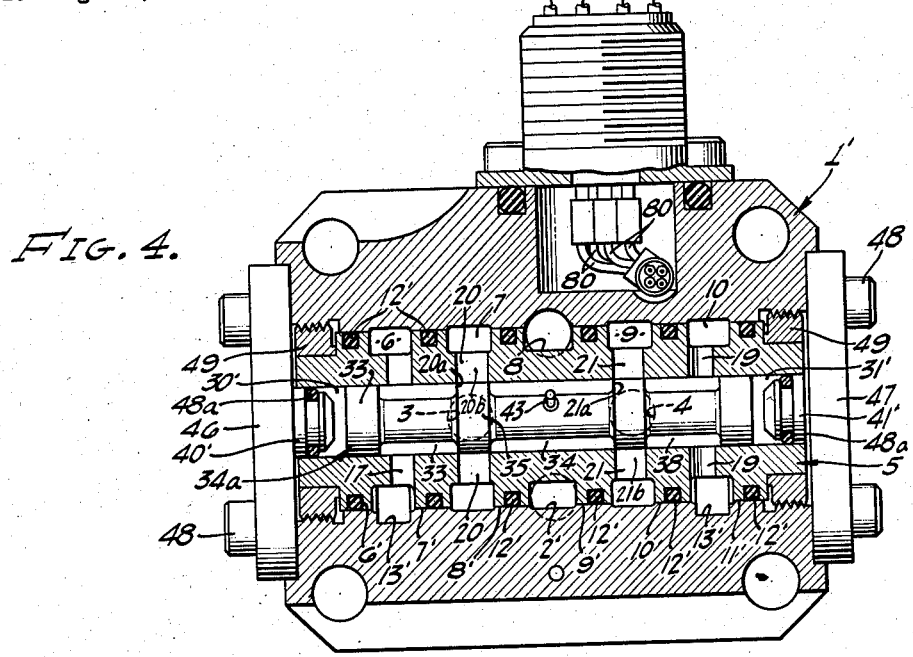

May 5, 1959  R. D. ATCHLEY  2,884,907
SERVO-MECHANISM
Filed Aug. 30, 1957  4 Sheets-Sheet 4
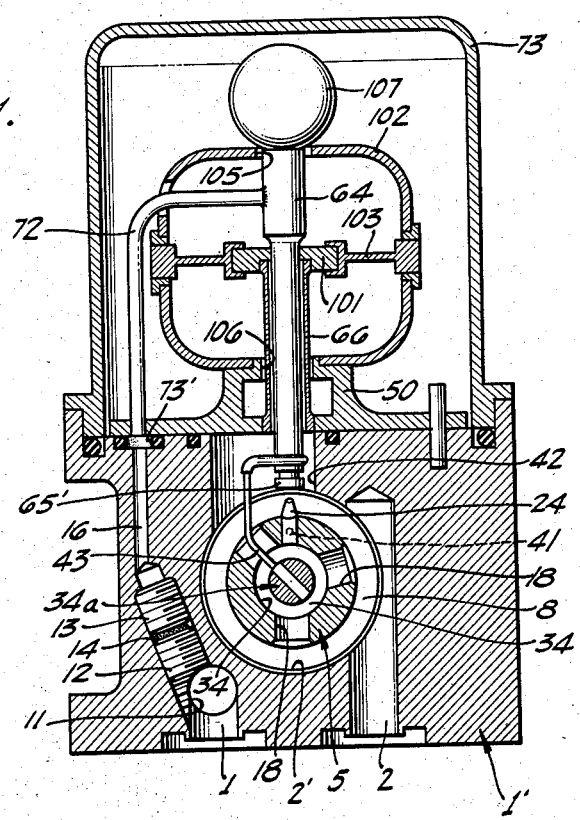
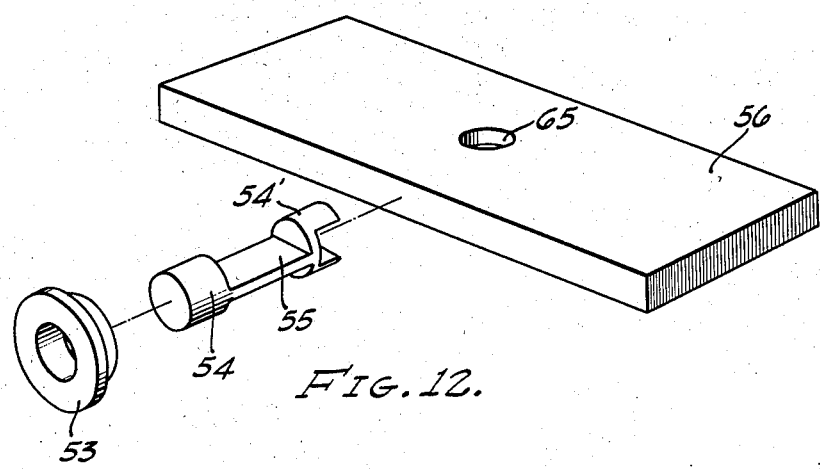
INVENTOR.
RAYMOND D. ATCHLEY
BY Philip Subkov
Max Geldin
ATTORNEYS United States Patent Office 2,884,907
Patented May 5, 1959

2,884,907

SERVO-MECHANISM

Raymond D. Atchley, Los Angeles, Calif., assignor to Raymond Atchley, Inc., Los Angeles, Calif., a corporation of California Application August 30, 1957, Serial No. 681,310

23 Claims. (Cl. 121—46.5)

This application is a continuation-in-part of application Serial No. 586,778, filed May 23, 1956.

This invention relates to a servo-mechanism of the hydraulic or pneumatic type.

The main components of my servo-mechanism consist of a hydraulic amplifier which is responsive to a displacement or force which may be relatively weak, and by hydraulic amplification is made to displace a piston or valve to control a fluid flow at a relatively high pressure.

The mechanism of the invention comprises a main valve composed of a valve body and a valve member which on displacement controls the magnitude and direction of flow of a fluid under pressure. The valve is actuated by a hydraulic amplifier which, in response to a signal transmitted to the mechanism, controls the magnitude and direction of flow of fluid for actuation of the main valve member and exerts a force to move the main valve member which is many times the signal input to the hydraulic amplifier. By means of a force feedback connection between the main valve member and the hydraulic amplifier operative in a direction to oppose the signal input, I may make the control of the flow of fluid responsive in direction and magnitude to the signal input to the hydraulic amplifier.

It is an object of my invention to control flow of fluid proportional in direction and magnitude to a signal generated by a device actuated by or requiring flow of fluid under high pressure.

It is an object of my invention to control such oil flow by a valve which opens or closes in response to such signal and whose opening or closing is responsive to the magnitude and direction and is proportional to the said signal strength or magnitude.

In my preferred embodiment, I employ a piston valve member acting under a differential pressure across said piston to open and close valve ports to direct the flow of a fluid, as for example a liquid. The differential pressure across said piston is controlled by a hydraulic amplifier in the form of two receptor jets, one jet connected to one side of said piston and the other jet connected to the other side of said piston. An ejector jet is positioned in operative association with said receptor jets. A fluid under pressure is fed to the ejector jet and means are provided to move said ejector jet responsive to said signal to cause more or less of the fluid emitting from said ejector jet to enter one or the other of said receptor jets. The differential pressure generated across said piston and the direction of said differential pressure will depend on the relative proportion of the flow of fluid from the ejector jet which enters the receptor jets.

The responsive motion of the piston is used to valve the flow of fluid and thus control the direction, pressure and volume rate of flow of the fluid.

Since the receptor jets are not mechanically connected to the ejector jets, no frictional forces are introduced and the proportioning of the flow in response to the signal is frictionless. Furthermore, since the ejector jet may be made to be of low mass and the restraint on its motion may be controlled as desired the natural frequency of the hydraulic amplifier may be proportioned either to be low or high as desired.

These and other objects of my invention will be further described in connection with the drawings, of which:

Fig. 2 is a longitudinal section taken on line 2—2 of Fig. 2;

Fig. 3 is a horizontal section taken on line 3—3 of Fig. 1;

Fig. 4 is a horizontal section taken on line 4—4 of Fig. 2;

Fig. 5 is a vertical section taken on line 5—5 of Fig. 2;

Fig. 8 is a section taken on line 8—8 of Fig. 2;

Fig. 11 is a sectional view taken on lines 11—11 of Fig. 10; and

Fig. 12 is an exploded view showing certain components of the torque motor.

Figure 1:
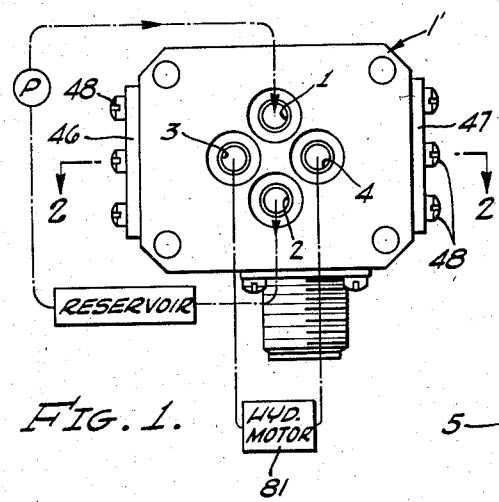
Fig. 1 is a bottom plan view of the device taken on line 1—1 of Fig. 2, showing the connections diagrammatically.

The valve case 1' contains a hole 1 (see Figs. 1, 2 and 5) which intersects a cross bore 11, as will be more fully described below. Case 1' also has a hole 2 which intersects a cross bore 2' drilled axially of the case 1'. Bore 1 and bore 2 are axially aligned in a plane and additional bores 3 and 4 are positioned in case 1' and axially aligned in a plane perpendicular to the plane of alignment of the bores 1 and 2.

Figure 6:
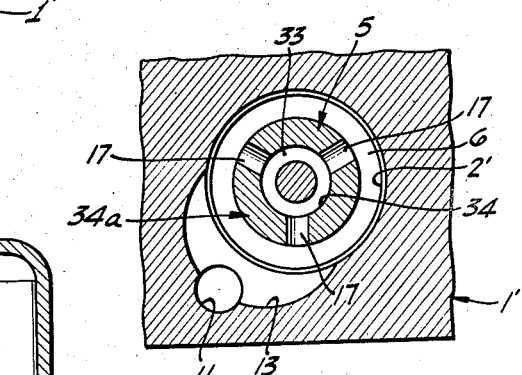
Fig. 6 is a vertical section taken on line 6—6 of Fig. 2.

Positioned in bore 2' is a sleeve 5 which is retained in the case 1' by retaining nuts 49. The case 1' and bore 34' of sleeve 5 are sealed by two end caps 46 and 47 held in place by suitable bolts 48. Sleeve 5 is grooved at 6, 7, 8, 9 and 10 to give lands 6', 7', 8', 9', 10', and 11'. At each land the sleeve 5 is sealed against the walls of the bore 2' by O-rings 12', as will be later described. The sleeve 5 is ported with bores 17 which connect the interior of the hollow spool with the transverse bore 11 by means of a milled slot 13, as is shown in Fig. 6. In like manner the sleeve is ported at 19 by bores which connect the interior of the sleeve and the transverse bore 11 by means of the groove 10 and a like slot 13', the section through the bores 19 and the slot 10 being the same as the section shown in Fig. 6.

The bore 2 intersects the bore 2' at groove 8, the groove 8 being connected to the interior of the spool by the bores 18, as shown in Fig. 5. The sleeve 5 is also formed with two diametrically opposed square ports 20 (see Fig. 7) having parallel sides 20a and 20b in a square configuration, the axis of the ports being perpendicular to the axis of the bore 3. The sleeve is also formed with two axially aligned ports 21 having a square configuration with parallel sides 21a and 21b perpendicular to each other, the axial alignment of the ports 21 being perpendicular to the axis of the bore 4. See also Fig. 4.

Figure 7:
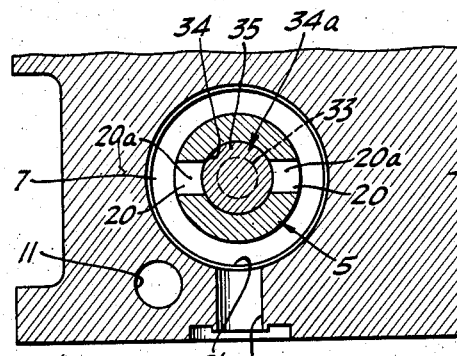
Fig. 7 is a vertical section taken on line 7—7 of Fig. 2.

It will be observed in Figs. 2 and 7 that the bore 3 communicates with the groove 7 and the bore 4 communicates with the groove 9, and that the grooves 7 and 9 communicate with the interior of the sleeve 5 only by way of the ports 20 and 21, respectively. The sleeve is axially bored with a bore 34' and carries a spool 34a in the form of a piston which makes a sliding engagement with the interior of sleeve 5, i.e., with the inside of the bore 34' by means of lands 33, 35, 37 and 39 formed by grooving the piston to give annular grooves 33', 34 and 38. The bore 17 is positioned intermediate the lands 33 and 35. The bore 18 is positioned intermediate the lands 35 and 37, and the bore 19 is positioned intermediate the lands 37 and 39. The port 20 has a width equal to the width of the land 35 and less than the diameter of the bore 3 and the width of the groove 7. The width of the port 21 is like that of 20, to wit, equal to the width of the land 37, and less than the width of the annular groove 9 and of the diameter of the bore 4.

Positioned at each end of the bore 34' are stop members 40' and 41' held in position by the bolts 48', and sealed by O-rings 48a as indicated. The sleeve 5 is further formed with two tapered bores 24a and 24b (see Fig. 9) into which the cone tip jets 24 and 25 are pressed. The jets are bored with inclined bores 26 and 27 which terminate in the cone tips 24' and 25'. The bore 26 communicates with a cross bore 41 which in turn communicates with a port 30 (see Fig. 2) which connects the bore 41 with the end of the spool or chamber 30' opposite the face of the land 33. The bore 27 communicates with a cross bore 40 which in turn communicates with a port 31, which connects with the end of the spool or chamber 31' opposite land 39. The ends of the cross bore are suitably sealed, as shown at 40" and 41". The conical jets 24 and 25 project into the groove 8.

The receptor jets 24 and 25 are identical in construction and the passages 40, 41 and the ports 30 and 31 are identical and symmetrically positioned so that the resistance to the flow from the ejector jet 65' described below, to the chambers 30' and 31' at the opposite ends of the piston 34a shall be substantially the same.

Positioned in the spool piston at the groove 34 is a spring wire 43 held in the spool by means of a set screw 45 inserted through the threaded bore 44. See Figs. 2 and 5.

Carried on the upper face of the case 1' is a torque motor assembly which in the main is described in my co-pending application Serial No. 583,487, filed May 8, 1956, of which this application is thus a continuation-in-part, the structure being modified as will be more fully described below. Said Application 583,487 is hereby incorporated into this specification by this reference.

The torque motor (see Figs. 2, 5, 8 and 12) is mounted on a mounting base 50 and is composed of a strapped frame 52 which carries the armature 56 mounted on torsion members 55 formed by milling the shaft member 54 to form a thin spring web member. One end of the shaft 54 is rigidly fixed by brazing to a bushing 53 which is rigidly fixed into strap 52 by brazing, and the other end is formed as a fork 54' into which the armature 56 is rigidly fixed by brazing. At each end of the frame 52 is positioned a pole and magnet assembly composed of a C-shaped magnet 57 and a C-shaped magnet 57' oriented with their north poles and south poles opposite each other, each such assembly carrying a pole piece 58 at the north pole and a pole piece 59 at the south pole spaced from each other to produce a gap 58'. The armature 56 is positioned symmetrically in each of said gaps to give four equal gaps, two at one end of the armature and two at the other end between the adjacent pole pieces. Interiorly of the frame 52 and between the magnet and pole piece assembly are positioned coils 61 and 62 which encompass the armature 56. Each of the coils is wound so as to be in bucking relation and inductively coupled with the armature 56. Interiorly of the frame 52 and abutting the pole pieces 58, one at the north pole and one at the south pole, are the magnetically conductive members or pieces 60.

The frame 52 is bored at 63 and the bars 60 are bored at 60' and the armature is bored at 65 to receive the jet pipe 64 which is positioned within the bores 63, 60' and 65, and between the windings 61 and 62, pipe 64 being rigidly affixed to the armature 56 in the bore 65. The flexible pipe 66, axially aligned with the pipe 64, is rigidly connected to the armature 56 in a counterbore 66'. The mounting 50 of the torque motor is bored at 50' to permit the passage of the tube 66 and the pipe 64. The tube 66 is rigidly connected at its end 66' to the fitting 50. The fitting 50 is connected to the top of the case 1' and sealed by means of O-ring 50a as shown.

The pipe 64 has ejector jet 65' brazed to it and extends into the slot 42 adjacent groove 8, and is connected at its lower end to the spring wire 43 (see Figs. 2 and 5) at the slot 42. The pipe 64 is bored with an axial bore 68, which connects with a cross bore 71 and a sufficiently flexible pipe 72. The pipe 72 registers and is in fluid communication with the space 73' to which the bore 16 in body 1' also connects. The bore 16 communicates with bore 1 via the restricted orifice 13' and the removable fittings 12 and 13 between which is positioned the screen 14. The base fitting 50 and space 73' are sealed by O-rings, as is also the enclosing cover 73.

Figure 9:
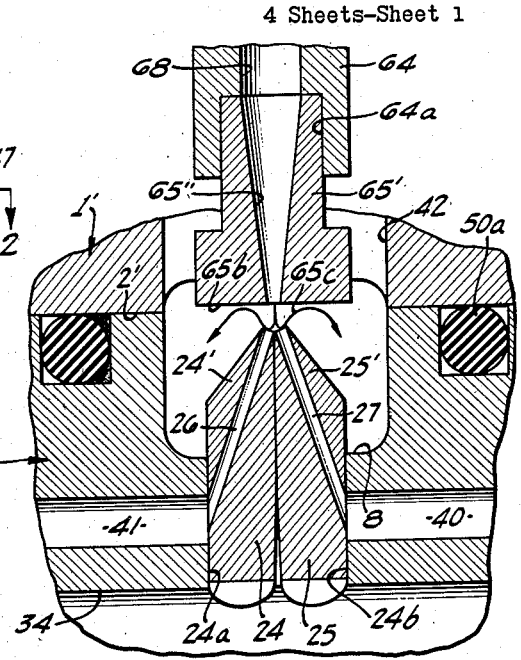
Fig. 9 is an enlarged sectional detail of the jet nozzle arrangement.

The relationship of the jet pipe 64 and the jets 24 and 25 is shown in the enlarged fragmentary view of Fig. 9. The pipe 64 is counterbored at 64a to receive the nozzle 65' axially aligned with the bore 68, and which has a downwardly tapered bore 65". The receptor jets 24 and 25 are pressed into the sleeve 5 so that the angularly disposed bores 26 and 27 are so positioned that the center line of the bore 68 bisects the acute angle between the axis of holes 26 and 27. The ends of the conical nozzles 24' and 25' are symmetrically positioned with respect to the center line 68 and the end of the nozzle 65'.

The configuration of the ejector nozzle 65' is shown to have a flat planar end 65b which is perpendicular to the axis of the bore 68 and is in extent considerably greater than the mouth of the angular bores 26 and 27. The configuration thus has the property that any emitted fluid, particularly if the fluid be liquid of substantial mass, impinging upon the ends of the conical portion of the receptor jets 24 and 25, particularly on the fluid filling the angular bores 26 and 27, will be reflected therefrom to impinge upon the lower end of the nozzle 65' substantially symmetrically about the axis of the bore 68. The fluid will be reflected at a point and in a direction away from the mouth of the receiver jets, discharging into the groove 8, as is schematically illustrated at 65c in Fig. 9. Furthermore, it will be observed that the point of reaction resulting from this impingement and reflection from the lower surface of the emitter or ejector jet creates a resultant of thrust on each side of the center line of the ejector jet, which is substantially equal and has an equal moment and are each parallel to the axis of the ejector jet. Since the tube 66 is rigid in this direction no displacement of the ejector jet results from this action. As a result no lateral forces of substantial effect are imposed upon the ejector jet to cause a lateral displacement due to the impingements of the reflected stream of fluid upon the ejector jet surfaces 65b. This affords a stability in the jet which is substantially independent of random displacement forces resulting from random variations in the pressure or volume of flow of the fluid from the ejector jet.

The inlet 1 is connected to a source of high pressure fluid, for example, oil pumped by a pump P (see Fig. 1) from a reservoir, and the outlet 2 is connected to the reservoir. The bores 3 and 4 are connected to a reversible hydraulic or pneumatic motor 81, either of the reciprocating kind or rotating kind, as is conventional in hydraulic or pneumatic servo-valve systems.

Assume that no signal is impressed on the coils 61 and 62 of the torque motor or that the signal is such that equal and opposing flux is generated in the torque motor by coils 61 and 62 so that the armature 56 is in the null position and centered in the gaps between the pole pieces 58 and 59. The jet pipe 64 is undeflected and the tube 66 is unbent and aligned symmetrically over receptor jets 24 and 25. The pipe 64 is in the position shown in Fig. 9. The spool 34a is in the position shown in Fig. 2 with the land 35 closing the square port 20 and the land 37 closing the square port 21.

Fluid under pressure entering through inlet 1 passes through pipes 16 and 72 (see Fig. 5) and through the bore 68 and the ejector jet 65'. It will be seen that with the bores 26 and 27 symmetrically placed, each of the bores 26 and 27 will receive an equal amount of fluid from the jet 65', any excess spilling into the slot 42 and the annular groove 8 being passed into the discharge pipe 2. The fluid through 26 and 27 being thus under equal pressure, exerts equal pressure against the ends of the lands 33 and 39, which have equal areas, the pressure being exerted through the ports 41 and 30 against the land 33 and through 40 and 31 against the land 39. The total force against both ends of the piston 34a being equal, the piston is centered with the ports 20 and 21 covered, as described above. The oil also flows from inlet 1 through the cross bore 11 into the annulus 10 via slot 13' and through the ports 19 into the annular groove 38, and the fluid from 11 passes through the slot 13 and the port 17 into the annular groove 33'. The piston therefore is hydraulically balanced notwithstanding the flow of oil in 1 and out 2, so long as the pressure on the nozzles 24 and 25 is maintained equal. Under those conditions the ports 20 and 21 are sealed off from the source of fluid pressure and the hydraulic motor is not actuated or otherwise disturbed by the flow of fluid in 1 and out 2.

Should a signal be impressed on leads 80 (see Fig. 4) which are connected to coils 61 and 62, so as to unbalance the flux induced by these coils to cause a deflection of the armature 56 in gaps 58', assuming, for example, that the deflection of the armature is clockwise as Fig. 2 is viewed, then the pipe 64 is rotated about an axis of rotation passing centrally through the flexures 55. This imposes a twist on the flexible tube 66 and a displacement of the end of the nozzle 65' to the left. It will be seen that more fluid will enter bore 26 of receptor jet 24 than enters bore 27 of receptor jet 25, and the pressure in 41 will become greater than the pressure in 40, and the spool is displaced to the right, uncovering the left-hand edge of the ports 20 and 21. It will be observed that the rate of displacement of the spool is proportional to the angle through which the nozzle 65' is moved, and this is proportional to the angle through which the armature 56 is moved. Because of the square nature of the ports 20 and 21 the orifice thus produced by the movement of the piston is directly proportional to its displacement. Under this condition fluid flows from the annular groove 33' through the port 20 into the pipe 3. It will be observed, however, that because the right-hand edge of the port 21 is covered by the land 37, fluid does not flow from the annular groove 38. Fluid thus flows from the port 3 into the hydraulic motor 81 (see Fig. 1) to displace the hydraulic motor or to actuate it, and the discharge from the hydraulic motor of fluid in an amount equal to that passing through 3 enters 4, the annular groove 9 through the uncovered edge 21a of the port 21, into the annular groove 34 and thence via the bore 18 (see Figs. 2 and 5) into the annular groove 8 and into the discharge port 2, and from 2 into the fluid source.

It will be observed that as the spool is displaced to the right a spring force is imposed upon the pipe 64 by means of the spring 43, which spring force is proportional to the displacement of the piston spool so that the spring introduces a restoring force in an amount equal to balance the torque generated by the torque motor in response to the signal and to restore the pipe 64 to its neutral position, shown in Fig. 9, at which place the pressure in nozzles 24 and 25 and the bores 26 and 27 are again equal, and further displacement of the piston cannot occur. The spring 43 thus acts as a force feedback to null out and balance the force of the signal causing the initial displacement. It will be observed that in so doing the initial displacement of the piston to produce the orifices at 20 and 21 occurring upon the reception of the signal is not altered so long as the signal exists in the torque motor at the original strength and direction. In consequence thereof, upon the reception of a signal in the torque motor the ejector jet 64 is displaced an amount proportional to the force of the signal in a direction determined by the direction of a signal, and the piston spool is displaced an amount proportional to the signal strength in a direction determined by the direction of the signal, and is maintained in such displaced condition so long as the signal remains unchanged in magnitude and direction.

A variable orifice is thus presented, the area of which is determined by the signal strength and is proportional thereto. Thus the flow of fluid from a high pressure source to the hydraulic motor is determined in magnitude and direction and is proportional to the strength of the signal originally imposed upon the torque motor. Should the signal increase in strength in the same direction, this additional signal will overcome the spring force of the feedback spring rod 43 and the pipe will again move to the left, as seen in Fig. 9. The pressure in 26 will rise and the pressure in 27 will fall, and the piston will move to the right to a new position depending upon the added strength of the signal, the feedback spring thus being further deflected will introduce a negative restoring force to bring the pipe 64 back to the null position shown in Fig. 9, thus halting the further movement of the piston spool, holding it in its new position with an increased opening in the variable orifices 21 and 20, and an increased flow of fluid from 3 to the hydraulic motor and back to 4.

Should the signal fall in strength but not reverse in direction, the spring force of 43 will move the jet pipe 64 to the right viewing Fig. 2, and now the bore 27 receives more fluid than does the bore 26, and the pressure in 40 is greater than in 41, and the spool moves to the left, reducing the opening of the variable orifice at 20 and 21. However, in so moving the spring 43 is so flexed that the jet 65' is moved to the left, thus bringing it back to the null position and holding the position in the new position with the new orifice size provided, and thus reducing the flow of the fluid exiting through 3 and returning through 4. This may continue until the signal strength passes through zero, in which case the lands 37 and 35 completely cover the ports 20 and 21 and no fluid flow occurs to the hydraulic or pneumatic motor.

Should the signal reverse in direction so that now the armature is caused to rotate counter-clockwise, the reverse situation occurs. The pipe 64 is moved to the right, the tube 66 bending for this purpose, and now the jet 27 receives more fluid than the jet bore 26. 40 is under greater pressure than the bore 41. The end of the piston at land 39 receives a greater force than does that at 33 and the piston moves to the left, uncovering the right-hand edge of the ports 20 and 21. Now the fluid flow is from 1 through 11, slot 13', annulus 10, bores 19, annular groove 38, and over the edge of 21a into the port 21 and into the annular groove 9, into the port 4, into the hydraulic motor and from the hydraulic motor into bore 3, into the annular groove 7, between the edge 20a and the edge of the land 35, into the annular groove 34, through the ports 18, into the annular groove 8, and the discharge 2. Any continued increase or variation in the signal imposed on 61 and 62 will cause the movement of the piston and its control and direction in reverse to that described in connection with the previously mentioned signals.

It will be observed that because of the seals 50a between the torque motor base 50 and the body 1', and the fact that the tubes 66 and 64 are sealed in and rigidly connected to 56, the space inside the torque motor and in the case 73 is completely sealed from the fluid, for example, oil, used to actuate the servo-valve, and is therefore dry. Furthermore, it will be observed that the tube 66 is rigid in an axial direction although flexible in a plane perpendicular to the axis of the tube. However, because of the flat spring-like web 55, the armature structure is rigid except for rotation about a line perpendicular to the axis of the tube 64. The tube 64, due to the mass of the upper end of pipe 64, is balanced so that acceleration in a line perpendicular to the plane of Fig. 2 will cause no substantial displacement of the tube 64 or rotation about the axis of the flexure 55. Consequently, no deflection of the armature resulting from acceleration, impact or other accidental forces will cause any movement of the valve, except only due to the signal imposed by coils 61 and 62, or due to an angular acceleration about an axis perpendicular to the axis of the tube 64 and passing centrally through the armature, since the armature does have mass and is spring restrained, due to the flexible web 55. However, because of the low mass of the armature and the permissible selection of flexibility of the web 55, the natural frequency of the structure can be controlled so that such accidental forces may be of no importance in the practical utility of the device. Additionally, it will be observed that because of the use of the tube 66 and the connection of the tube to the tube 64 at a substantially coincident point with the axis of rotation of the armature 56, the angular displacement of the jet 65' may be made substantially equal to the angular displacement of the armature 56, thus producing a system of high sensitivity. The construction results in a dry torque motor housing and the magnetic system is secured against accidental contamination by trapped magnetic particles which may occur in the oil and which might otherwise contaminate the air gaps of the torque motor, and as described above the torque motor armature is stabilized against random motions due to random vibrations resulting from acceleration forces.

Furthermore, it will be observed that the ejector jet 65' and the receptor jets 24 and 25 together create a substantially frictionless push-pull hydraulic amplifier to amplify the relatively low power of the torque motor. By valving the high pressure fluid flow and controlling the magnitude of the pressure thus generated by the high pressure fluid flow against the piston ends, the main valve piston spool is moved back and forth within the close fitting bore 34'. The force necessary to move this piston may be relatively high and would not compare to the power generated by the torque motor, but by the use of the jets of my invention the low power output of the torque motor is amplified by this hydraulic amplifier to move the spool with relatively large force. Additionally, it will be observed that the displacement of the main valve piston is controlled by the torque motor, hydraulic amplifier and feedback spring so that its displacement from mid-position is proportional in direction and magnitude to the differential current of the torque motor. Oil leaving the hydro-dynamically ideal ejector jet 65' travels a short distance at high velocities and impinges onto openings in the two receptor jets 24 and 25. If the projected jet oil flows equally into each of receptor jet bores 26 and 27 the recovery pressure in each receptor jet will be equal and approximately equal to one-half the pressure of the fluid exiting the jet 65', and the pressure in the bores 40 and 41 will be equal.

The restrictor orifice 13' (Fig. 5) is used to reduce the pressure to the ejector jet 65'. By reducing the pressure in the ejector jet 65', the hydraulic amplifier null leakage is reduced. That is, the oil splash into the slot 42 and groove 8 is reduced. The reduction in the pressure also improves the maintenance of a solid stream of oil exiting from the jet 65'. The oil flow is non-cavitating in nature. If the oil flow in 1 is of sufficiently low pressure the pressure reducing restriction at 13' may be omitted.

Additionally it will be noticed that the receptor nozzles 24 and 25 are rigidly and immovably positioned, and only the ejector jet moves, thus insuring a high accuracy of response and a controlled natural frequency, and a high efficiency of recovery pressure. This permits the spool to move a distance different from and many times greater than the movement of the jet 65'. Because the movement of the jet may be made small when the spool movement remains large, the dynamic response and natural frequency of the hydraulic system may be controlled to the desired degree.

Furthermore, the structure may be seen to constitute a four-arm hydraulic bridge which has twice the sensitivity of the previous single ejector jet-single receptor jet two-arm hydraulic bridge. The hydraulic amplifier is frictionless and therefore allows the valve to have a very high degree of resolution. It is possible to use a relatively large hole in the ejector jet and this allows the passage of large dirt particles which would disable conventional valves. If the ejector jet 65' should become partially plugged due to dirt particles the oil emitting from the jet will still control the main spool (i.e., it will not be displaced to its full stroke as in other valves).

When the differential signal current goes to zero, for example, in power failure, the valve centers. The servo gain can be easily controlled by changing the stiffness of the feedback spring.

Although the above described specific illustration of the adaptation of the servo-valve to a servo system in which the force necessary to move the ejector jet responsive to an impressed signal, is an electro-magnetic device, such as the torque motor there illustrated, the signal for moving a jet may be any other force, either electric, magnetic, or mechanical, and may be even moved manually by means of a handle connected by a spring to the jet pipe 64 so that the jet 65' is moved with a force proportional to the displacement of the handle.

Figure 10:
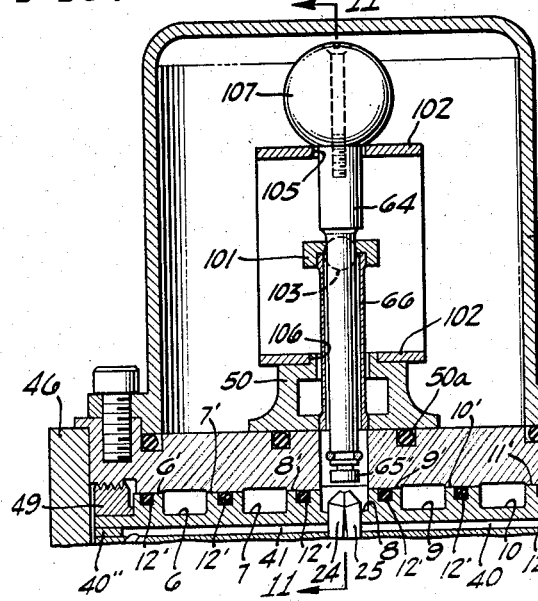
Fig. 10 is a modification of the device of Fig. 2.

Figs. 10 and 11 illustrate the employment of the servo-valve in an application where the force is an inertial force. The structures are identical to the structures illustrated in Figs. 1 to 9, except that the torque motor has been removed and the flexible tube 66 and the ejector pipe 64 have been rigidly connected to a collar 101. Mounted upon the base 50 is a frame 102 similar to the frame 52 of the torque motor in which is mounted a flexure 103 similar in construction and function to the flexure 55, one end of the flexure 103 being rigidly connected to the frame 102, the other end of the flexure 103 being rigidly connected to the collar 101, to which is also rigidly connected the flexure tube 66 and the jet tube 64, the end of the jet tube 64 protruding through a hole 105 in the top of the frame, and the jet tube and the flexure tube protruding through a hole 106 in the bottom of the frame similarly to the construction shown in Figs. 1 to 9. At the top of the tube 64 is a ball 107 with its center positioned axially to the tube 64. It will be observed that the structure is rigid against all vibratory or acceleration forces except in the plane of the drawing of Fig. 10, and that upon any translational acceleration, that is, in a straight line in the plane of the Fig. 10, a moment will be created upon the axis passing through the flexure to cause a rotation or angular displacement of the jet pipe 64. A similar displacement will occur if the structure is caused to be accelerated angularly in the plane of Fig. 10.

The device of Figs. 10 and 11 is insensitive to translational accelerations when the acceleration vector is parallel to the center line of the tube 64 and the tube 66. The device is also insensitive to translational accelerations whose directional vector is in a plane parallel to the central plane of the flexure 103. The device is sensitive to angular accelerations only in the plane of Fig. 10.

It is noted that in the device of Figs. 10 and 11, the mass of the tube and the ball above the flexure should be greater than the mass of the tube below the flexure 103. However, if it is desired to make the angular accelerometer insensitive to translational acceleration the masses of the structure below and above the flexure point may be made equal, and if it is desired to make the device sensitive to both lateral and angular acceleration at the same time, then as in the case of the translational acceleration the mass of the ball and the tube above the flexure may be made greater than below the flexure.

In the structures as described above it was assumed that the lands 35 and 37 (Fig. 2) completely sealed off the ports 20 and 21 when the spool 34a is centered. The full fluid feed pressure exists in port 1 and bore 11 and cavities 33' and 38. Cavity 34 and outlet port 2 are shut off from the port 1 and are thus under the pressure of the reservoir. In like manner, the outlet ports 3 and 4 are sealed from the inlet port 1 and are each under the pressure existing in the hydraulic motor. The sensitivity of the device in part depends upon the degree of motion of the spool 34a required to establish at the ports 20 or 21 the feed pressure required to actuate the hydraulic motor.

In order therefore to obtain a desirable high sensitivity, a minimum motion of the spool is desired for this purpose. It is therefore desirable that the edges of the lands 37 coincide with the right and left hand edges 20a and 21a to a close tolerance. Such fits are desirably "hairline" fits. For example, the edges of the lands may coincide with the edges of the ports with a tolerance of plus or minus .0001". With such fits there is always, even when the spool is centered, a small amount of residual leakage from the groove 33', underneath the left edge of the land 35 and into port 20 and out of port 20 underneath the right hand edge of the land 35 into the groove 34 and from the groove 34 into the port 2. A similar leakage exists from the groove 38 underneath the edges of the land 37 and port 21 into the groove 34.

With all of the fits of the edges of the lands 35 and 37 and the edges of the ports 20 and 21 being substantially the same, the pressure existing in the ports 20 and 21 will each be approximately equal to one-half of the pressure existing in the grooves 33' and 38, while the pressure in the port 34 will be that at the discharge port 2. Thus the system in the spool constitutes a four-arm hydraulic bridge. In the same manner, with the spool centered and with the jet 65' in the position shown in Fig. 2, the bores 26 and 27 receive equal pressure. The pressure in the bores 26 and 27 will be each approximately one-half of the pressure in the bore 68. The pressure in the grooves 42 and 8 will be at reservoir pressure. The jets therefore also constitute a four-arm hydraulic bridge.

The torque motor, due to the fact that it is responsive to a differential current in the coils 61 and 62 and due to the presence of the four air gaps 58', as illustrated in Fig. 2, is also a four-arm electromagnetic bridge. We therefore have three bridges in series. The sensitivity of response to the input signal is multiplied by the series of hydraulic bridges which are employed. The power developed by the signal is hydraulically amplified by a two-stage hydraulic amplifier. Furthermore, because of the construction and use of the hair-line fits of the edges of the lands 35 and 37 and the square ports 20 and 21, the pressure in 20 or 21 rises from one-half line pressure to full line pressure and the pressure in the corresponding square port 21 or 20 falls from one-half line pressure to reservoir pressure as the spool is displaced a minimal amount from the null, for example, less than .001". The dimensions given above are illustrative only.

While I have described particular embodiments of my invention for the purpose of illustration, it should be understood that various modifications and adaptations thereof may be made within the spirit of the invention as set forth in the appended claims.

I claim:

1. A valve comprising a sleeve, a spool in said sleeve, a chamber in said sleeve at each end of said spool, a fluid inlet port to said sleeve, a fluid outlet port in said sleeve, a plurality of variable orifices in said sleeve, means on said spool for adjusting the opening of said variable orifices upon motion of said spool in said sleeve, a pair of stationary receptor jets positioned exteriorly of said chambers, a fluid connection from one of said jets to one of said chambers, a fluid connection from the other of said jets to the other of said chambers, a movable ejector jet in fluid communication with said stationary jets, a fluid communicating passageway between said fluid inlet port and said ejector jet and a fluid communicating passageway between said outlet port and said ejector jet, and a fluid communicating passageway between each of said variable orifices and said inlet and outlet ports.

2. A combination with the valve of claim 1, a signal responsive device operatively connected to said movable jet for producing a force on said movable jet to move the same, and means to move said jet between said fixed receptor jets responsive to a force produced by said signal, whereby more fluid enters one of said receptor jets and less fluid enters the other of said receptor jets responsive to said signal.

3. In the device of claim 1, a force feedback connection between said spool and said movable jet.

4. In the device of claim 3, said feedback connection comprising a spring, one end of said spring connected to said spool and the other end of said spring connected to said movable jet.

5. In the device of claim 2, said spool being displaced upon said motion of said ejector jet, a force feedback connection between said spool and said movable jet, said force feed back connection developing a force upon said movable jet, upon said displacement of said spool, which force is equal and opposite to the force upon said movable jet produced by said signal.

6. In the device of claim 1, said receptor jets being fixedly positioned in closely adjacent position in said sleeve.

7. In the device of claim 2, said receptor jets being fixedly positioned in closely adjacent position in said sleeve.

8. In the device of claim 3, said receptor jets being fixedly positioned in closely adjacent position in said sleeve.

9. In the device of claim 1, said receptor jets being angularly disposed at an acute angle to each other, and said movable jet being positioned with its axis bisecting the angle of said angularly disposed jets.

10. In the device of claim 2, said receptor jets being angularly disposed at an acute angle to each other, and said movable jet being positioned with its axis bisecting the angle of said angularly disposed jets.

11. In the device of claim 1, a pair of additional ports in fluid communication with said variable orifices and in fluid communication with the exterior of said valve and adapted for connection to a fluid motor.

12. In the device of claim 1, a torque motor including an armature, said ejector jet being mounted on the armature of said torque motor for motion with said armature responsive to a signal received by said torque motor.

13. In the device of claim 12, said ejector jet including a pipe fixedly positioned in the armature of the torque motor, and a flexure tube positioned about said pipe axially thereof, one end of said tube being connected to said armature and the other end of said tube being stationary.

14. A valve comprising a sleeve, a spool in said sleeve, a chamber in said sleeve at each end of said spool, a fluid inlet port to said sleeve, a fluid outlet port in said sleeve, lands on said spool forming annular chambers between said spool and said sleeve, a plurality of ports in said sleeve adjacent each land each land covering said ports adjacent each land in the centered position of said spool, movement of said spool and said lands with respect to said ports forming a plurality of variable orifices in said sleeve, said lands adjusting the opening of said variable orifices upon motion of said spool in said sleeve, a pair of stationary receptor jets positioned exteriorly of said chambers, a fluid connection from one of said jets to one of said chambers, a fluid connection from the other of said jets to the other of said chambers, a movable ejector jet in fluid communication with said stationary jets, a fluid communicating passageway between said fluid inlet port and said ejector jet and a fluid communicating passageway between said inlet port and said outlet port through said ejector jet, and a fluid communicating passageway between each of said variable orifices and said inlet and outlet ports whereby on motion of said spool in one direction certain of said orifices adjacent certain of said lands are connected to the inlet port and certain others of said orifices adjacent another of said lands are connected to the outlet port.

15. A valve comprising a sleeve, a spool in said sleeve, a chamber in said sleeve at each end of said spool, a fluid inlet port to said sleeve, a fluid outlet port in said sleeve, a plurality of variable orifices in said sleeve, means on said spool for adjusting the opening of said variable orifices upon motion of said spool in said sleeve, a pair of stationary receptor jets, a fluid connection from one of said jets to one of said chambers, a fluid connection from the other of said jets to the other of said chambers, a movable ejector jet in fluid communication with said stationary jets, a torque motor including an armature, said ejector jet being mounted on the armature of said torque motor for motion with said armature responsive to a signal received by said torque motor, said receptor jets being fixedly positioned in closely adjacent position in said sleeve, a fluid communicating passageway between said fluid input port and said ejector jet and a fluid communicating passageway between said outlet port and said ejector jet, and a fluid communicating passageway between each of said variable orifices and said input and outlet ports, and a pair of additional ports in fluid communication with said variable orifices and in fluid communication with the exterior of said valve and adapted for connection to a fluid motor.

16. In the device of claim 15, said ejector jet including a pipe fixedly positioned in the armature of the torque motor, and a flexure tube positioned about said pipe axially thereof, one end of said tube being connected to said armature and the other end of said tube being stationary, said receptor jets being angularly disposed at an acute angle to each other, and said movable jet having a flat end adjacent said receptor jets and being positioned with its axis bisecting the angle of said angularly disposed jets, and a force feedback connection between said spool and said movable jet.

17. In the device of claim 16, lands on said spool forming annular chambers between said spool and said sleeve, said variable orifices comprising a pair of square ports in said sleeve adjacent a pair of said lands, said means for adjusting said variable orifices comprising said pair of lands covering said last mentioned ports in the centered position of said spool, movement of said spool and said lands with respect to said pair of ports forming said pair of variable orifices in said sleeve.

18. A fluid actuated servo-valve comprising a valve body, a slidable valve member in said valve body, a fluid inlet and a fluid outlet port in said valve body, fluid actuated means to move said valve member, said fluid actuated means comprising a piston means, a pair of chambers one on each end of said piston means, means to exert fluid pressure in each of said chambers, said means including a pair of stationary receptor jets positioned exteriorly of said chambers and a movable ejector jet disposed opposite said receptor jets, said movable jet discharging into said receptor jets, means for moving said movable jet responsive to a signal, a fluid conduit connected to said fluid inlet port and to said movable jet, and a fluid passageway adapted to receive fluid discharged from said movable jet and communicating with said outlet port.

19. In the valve of claim 18, variable orifices in said valve body, said valve member on motion thereof varying the opening of said variable orifices, and a fluid passageway between each of said orifices and said inlet and outlet ports, the feed to said inlet port being controlled through said variable orifices.

20. In the valve of claim 18, said ends of said piston means having substantially equal area.

21. A valve mechanism comprising a sleeve, a valve member in said sleeve, a fluid inlet port to said sleeve, a fluid outlet port in said sleeve, fluid actuated means to move said valve member, said fluid actuated means comprising a pair of pistons connected to opposite ends of said valve member, a pair of chambers one on each end of said pistons, a pair of variable orifices in said sleeve, means on said valve member for adjusting the opening of said variable orifices upon motion of said valve member in said sleeve, a pair of stationary receptor jets positioned exteriorly of said chambers, a fluid connection from one of said jets to one of said chambers, a fluid connection from the other of said jets to the other of said chambers, a movable ejector jet in fluid communication with said stationary jets, a fluid communicating passageway between said fluid input port and said ejector jet and a fluid communicating passageway between said inlet port and said outlet port through said ejector jet, and a fluid communicating passageway between each of said variable orifices and said inlet and outlet ports.

22. A servo-valve responsive to acceleration, which comprises a sleeve, a spool in said sleeve, a chamber in said sleeve at each end of said spool, a fluid inlet port to said sleeve, a fluid outlet port in said sleeve, a plurality of variable orifices in said sleeve, means on said spool for adjusting the opening of said variable orifices upon motion of said spool in said sleeve, a pair of stationary receptor jets positioned exteriorly of said chamber, a fluid connection from one of said jets to one of said chambers, a fluid connection from the other of said jets to the other of said chambers, a frame, a movable ejector jet in fluid communication with said stationary jets, said ejector jet including a tube in fluid communication with said jet, a weight on said tube, said tube mounted on said frame, a flexible connection between said tube and said frame connected to said frame and to said tube between said weight and said movable jet, a fluid communicating passageway between said fluid inlet port and said ejector jet, and a fluid communicating passageway between said outlet port and said ejector jet, and a fluid communicating passageway between each of said variable orifices and said inlet and outlet ports, and a pair of additional ports in fluid communication with said variable orifices, said additional ports being in fluid communication with the exterior of said valve and adapted for connection to a fluid motor, whereby on acceleration of said valve said movable jet moves toward one of said stationary jets and away from the other of said stationary jets.

23. In the valve of claim 22, a force feedback connection between said spool and said movable jet whereby a force opposing said motion of said movable jet is exerted on said movable jet on motion thereof.

References Cited in the file of this patent

UNITED STATES PATENTS 2,228,015    Neukirch  --------------- Jan. 7, 1941